United States Patent [19]
Berl et al.

[11] Patent Number: 5,991,302
[45] Date of Patent: *Nov. 23, 1999

[54] TECHNIQUE FOR MAINTAINING PRIORITIZATION OF DATA TRANSFERRED AMONG HETEROGENEOUS NODES OF A COMPUTER NETWORK

[75] Inventors: Steven H. Berl, Piedmont; Kushal A. Patel, Sunnyvale, both of Calif.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,435

[22] Filed: Apr. 10, 1997

[51] Int. Cl.⁶ .................................................. H04L 12/48
[52] U.S. Cl. ...................... 370/400; 370/389; 370/401; 370/469
[58] Field of Search ....................... 370/401, 440, 370/352, 389, 405, 400, 466, 469; 395/200.58, 200.33, 112; 380/49; 709/200

[56] References Cited

U.S. PATENT DOCUMENTS

| | | | |
|---|---|---|---|
| 4,922,486 | 5/1990 | Lidinsky et al. | 370/60 |
| 5,210,750 | 5/1993 | Nassehi et al. | 370/440 |
| 5,261,060 | 11/1993 | Free | 395/325 |
| 5,274,631 | 12/1993 | Bhardwaj | 370/60 |
| 5,317,568 | 5/1994 | Bixby et al. | 370/401 |
| 5,416,769 | 5/1995 | Karol . | |
| 5,440,744 | 8/1995 | Jacobson et al. | 395/200.33 |
| 5,446,888 | 8/1995 | Pyne | 395/600 |
| 5,473,608 | 12/1995 | Gagne et al. | 370/401 |
| 5,546,549 | 8/1996 | Barrett et al. | 395/309 |
| 5,561,669 | 10/1996 | Lenney et al. | 370/352 |
| 5,634,006 | 5/1997 | Baugher et al. | 395/200.58 |
| 5,719,942 | 2/1998 | Aldred et al. | 380/49 |
| 5,768,271 | 6/1998 | Seid et al. | 370/389 |
| 5,781,726 | 7/1998 | Pereira | 709/200 |
| 5,787,237 | 7/1998 | Reilly | 395/112 |
| 5,892,924 | 4/1999 | Lyon et al. | 370/405 |

OTHER PUBLICATIONS

Designing APPN Internetworks, http://www.cisco.com/univercd/cc/td/doc/cisintwk/idg4/nd2006.htm, Copyright 1989–1998, pp. 1 to 39.

IBM, "Systems Network Architecture Formats", Publication No. GA27–3136–16.

IBM, "Systems Network Architecture, APPN Architecture Reference", Publication No. SC30–3422–04.

Nilausen, Jesper—APPN Networks; John Wiley & Sons, Ltd. 1994; APPN Basics 2:11–83.

*Primary Examiner*—Zarni Maung
*Assistant Examiner*—Philip B. Tran
*Attorney, Agent, or Firm*—Cesari and McKenna LLP

[57] ABSTRACT

A technique maintains priority of packets transmitted over a heterogeneous network by a hybrid node coupled to the network. The hybrid node assigns each packet a transmission priority (TP) level as it traverses protocol layers of a communications stack of the node. An application programming interface extension provides a tagging mechanism for conveying the TP levels from higher protocol layers of the stack to lower layers. The TP levels are then converted to information that is "tagged" to the packets and these tagged packets are then apportioned among a plurality of communication sessions based on the TP level assigned to each packet. The tagged packets and their associated sessions preserve the priority and order of the packets across the heterogeneous network.

18 Claims, 6 Drawing Sheets

TECHNIQUE FOR MAINTAINING PRIORITIZATION OF DATA TRANSFERRED AMONG HETEROGENEOUS NODES OF A COMPUTER NETWORK

CROSS-REFERENCE TO RELATED APPLICATIONS

This invention is related to the following copending U.S. Patent Applications:

U.S. patent application Ser. No. 08/833,834, Atty. Docket No. 112025-30, titled MECHANISM FOR CONVEYING DATA PRIORITIZATION INFORMATION AMONG HETEROGENEOUS NODES OF A COMPUTER NETWORK, which application was filed on even date herewith and assigned to the assignee of the present invention;

U.S. patent application Ser. No. 08/833,837, Atty. Docket No. 112025-31, titled TECHNIQUE FOR CAPTURING INFORMATION NEEDED TO IMPLEMENT TRANSMISSION PRIORITY ROUTING AMONG HETEROGENEOUS NODES OF A COMPUTER NETWORK, which application was filed on Apr. 10, 1997 and assigned to the assignee of the present invention; and U.S. patent application Ser. No. 08/926,539, Atty. Docket No. 112025-28, titled TECHNIQUE FOR REDUCING THE FLOW OF TOPOLOGY INFORMATION AMONG NODES OF A COMPUTER NETWORK, which application was filed on Sep. 10, 1997 and assigned to the assignee of the present invention.

FIELD OF THE INVENTION

The invention relates to computer networks and, more particularly, to the distribution of prioritization information among stations of a computer network.

BACKGROUND OF THE INVENTION

Data communication in a computer network involves the exchange of data between two or more entities interconnected by communication links and sub-networks. These entities are typically software programs executing on hardware computer platforms, such as end stations and intermediate stations. Examples of an intermediate station may be a router or switch which interconnects the communication links and subnetworks to enable transmission of data between the end stations. A local area network (LAN) is an example of a subnetwork that provides relatively short distance communication among the interconnected stations; in contrast, a wide area network (WAN) enables long distance communication over links provided by public or private telecommunications facilities.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. Examples of such communications architectures include the Systems Network Architecture (SNA) developed by International Business Machines Corporation and the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide inter-networking services and the upper layers, which are the users of these services, collectively provide common network application services. The application layer 112 provides services suitable for the different types of applications using the network, while the lower network interface layer 120 of the Internet architecture accepts industry standards defining a flexible network architecture oriented to the implementation of LANs.

Specifically, the network interface layer 120 comprises physical and data link sublayers. The physical layer 126 is concerned with the actual transmission of signals across the communication channel and defines the types of cabling, plugs and connectors used in connection with the channel. The data link layer, on the other hand, is responsible for transmission of data from one station to another and may be further divided into two sublayers: Logical Link Control (LLC 122) and Media Access Control (MAC 124). The MAC sublayer 124 is primarily concerned with controlling access to the transmission medium in an orderly manner and, to that end, defines procedures by which the stations must abide in order to share the medium. The LLC sublayer 122 manages communications between devices over a single link of the network and provides for environments that need connectionless or connection-oriented services at the data link layer.

Connection-oriented services at the data link layer generally involve three distinct phases: connection establishment, data transfer and connection termination. During connection establishment, a single path or connection, e.g., an IEEE 802.2 LLC Type 2 or "Data Link Control" (DLC) connection as referred hereinafter, is established between the source and destination stations. Once the connection has been established, data is transferred sequentially over the path and, when the DLC connection is no longer needed, the path is terminated. The details of such connection establishment and termination are well-known and, thus, will not be described herein.

The transport layer 114 and the internetwork layer 116 are substantially involved in providing predefined sets of services to aid in connecting the source station to the destination station when establishing application-to-application communication sessions. The primary network layer protocol of the Internet architecture is the Internet protocol (IP) contained within the internetwork layer 116. IP is primarily a connectionless network protocol that provides internetwork routing, fragmentation and reassembly of datagrams and that relies on transport protocols for end-to-end reliability. An example of such a transport protocol is the Transmission Control Protocol (TCP) contained within the transport layer 114. Notably, TCP provides connection-oriented services to the upper layer protocols of the Internet architecture. The term TCP/IP is commonly used to refer to the Internet architecture.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of the stack 175 until it arrives at the receiving process.

SNA is a mainframe-oriented network architecture that also uses a layered approach. The services included within this architecture are generally similar to those defined in the Internet communications architecture. In a SNA network, though, applications executing on end stations typically access the network through logical units (LU) of the stations; accordingly, in a typical SNA network, a communication session connects two LUs in a LU-LU session. Activation and deactivation of such a session is addressed by Advanced Peer to Peer Networking (APPN) functions.

The APPN functions generally include session establishment and session routing within an APPN network. FIG. 2 is a schematic block diagram of a prior art APPN network 200 comprising two end stations 202, 212, which are typically configured as end nodes (EN), coupled to token ring (TR) subnetworks 204, 214, respectively. During session establishment, an EN (such as EN 202) requests an optimum route for a session between two LUs; this route is calculated and conveyed to EN 202 by an intermediate station (e.g., station 206) via a LOCATE message exchange through the network 200. Thereafter, a "set-up" or BIND message is forwarded over the route to initiate the session. The BIND includes information pertaining to the partner LU requested for the session.

Intermediate session routing occurs when the intermediate stations 206, 216, configured as APPN network nodes (NN), are present in a session between the two end nodes. As can be seen, the APPN network nodes are further interconnected by a WAN 210 that extends the APPN architecture throughout the network. The APPN network nodes forward packets of an LU-LU session over the calculated route between the two APPN end nodes. An APPN network node is a full-functioning APPN router node having all APPN base service capabilities, including session services functions. An APPN end node, on the other hand, is capable of performing only a subset of the functions provided by an APPN network node. APPN network and end nodes are well-known and are, for example, described in detail in *Systems Network Architecture Advanced Peer to Peer Networking Architecture Reference* IBM Doc SC30-3422 and *APPN Networks* by Jesper Nilausen, printed by John Wiley and Sons, 1994, at pgs 11–83.

FIG. 3 is a schematic block diagram of the software architecture of a prior art APPN node 300. As noted, application 302 executing on an APPN end node, such as EN 202 of network 200, communicates with another end node, such as EN 212, through a LU-LU session; LU 304 within each end node functions as both a logical port for the application to the network and as an end point of the communication session. The session generally passes through a path control module 312 and a data link control (DLC) module 316 of the node, the latter of which connects to various network transmission media.

When functioning as an APPN router node, such as NN 206, an intermediate session routing (ISR) module 305 maintains a portion of the session in each "direction" with respect to an adjacent network node, such as NN 216 of network 200. In response to receiving the BIND message during session establishment, path control 312 and ISR 305 are invoked to allocate resources for the session. In particular, each NN 206, 216 allocates a local form session identifier for each direction of the session. Collectively, each of these individually-established "local" sessions form the logical communication session between the LUs 304 of the end nodes 202, 212.

When initiating a session, the application 302 specifies a mode name that is carried within the BIND message and thus distributed to all APPN network nodes; the LU 304 in each node uses the mode name to indicate the set of requored characteristics for the session being established. Specifically, the mode name is used by control point (CP) module 308 of each APPN node 300 to find a corresponding class of service (COS) as defined in a COS table 310. The CP coordinates performance of all APPN functions within the node, including management of the COS table 310. The COS definition in table 310 includes a priority level specified by transmission priority (TP) information 320 for the packets transferred over the session; as a result, each APPN network node is apprised of the priority associated with the packets of a LU-LU session. The SNA architecture specifies four (4) TP levels: network priority, high priority, medium priority and low priority. Path control 312 maintains a plurality of queues 314, one for each TP level, for transmitting packets onto the transmission media via DLC 316.

Data link switching (DLSw) is a forwarding mechanism for the SNA architecture over an IP backbone network, such as the Internet. A heterogeneous DLSw network is formed when two DLSw switches interconnect the end nodes of the APPN network by way of the IP network; the DLSw switches preferably communicate using a switch-to-switch protocol (SSP) that provides packet "bridging" operations at the LLC (i.e., DLC) protocol layer. FIG. 4 is a schematic block diagram of a prior art DLSw network 400 comprising DLSw switches 406, 416 interconnecting ENs 402, 412 via IP network 410. The DLSw forwarding mechanism is also well-known and described in detail in *Request for Comment* (RFC) 1795 by Wells & Bartky, 1995 at pgs 1–91.

According to the DLSw technique, a lower-layer DLC connection is established between each EN and DLSw switch; however, these connections terminate at the switches 406, 416. In order to provide a complete end-to-end connection between the end nodes, the DLC connections are "disposed" over a reliable, higher-layer transport mechanism, such as TCP sessions. DLSw switches can establish multiple, parallel TCP sessions using well-known port numbers. All packets associated with a particular DLC connection typically follow a single, designated TCP session. Accordingly, SNA data frames originating at a sending EN 402 are transmitted over a particular DLC connection along TR 404 to DLSw switch 406, where they are encapsulated within a designated TCP session as packets and transported over IP network 410. The packets are received by DLSw switch 416, decapsulated to their original frames and transmitted over a corresponding DLC connection of TR 414 to EN 412 in the order received by switch 406 from EN 402.

Typically, all packets transmitted by DLSw switch 406 over a DLC connection/TCP session flow at the same priority level from a single output queue 405 of the switch and, as noted, arrive at an output queue 415 of DLSw switch 416 in the same order in which they are transmitted. When the switches are configured as bridges to forward packets over a TCP session through the IP network, prioritization is straightforward. However, it may be desired to integrate the functions of an APPN network node within switch 406 by overlaying an APPN layer onto a DLSw layer of the switch; the resulting hybrid node may prioritize the packets at the APPN layer in an order governed by the TP information levels.

A problem that arises when deploying a hybrid node in such a heterogeneous network is that the TP priority information is lost when passing the packets between the APPN and DLSw layers, primarily because the TP information is not encapsulated within the packets. That is, the APPN layer has knowledge of the TP levels associated with the packets of a LU-LU session by virtue of the BIND message exchange during session establishment; yet that information is not encapsulated within the associated packets and, thus, is not conveyed beyond the APPN layer.

Specifically, the packets are passed from the APPN layer in priority order and "fimneled" onto the single output queue of the DLSw layer for transmission over the appropriate DLC connections/TCP sessions between the DLSw switches; as noted, the order of these packets is typically preserved from end point to end point over the communication sessions. However, if there is congestion within the IP network, e.g., at intermediate queuing points within intermediate routers, there is no information within the packets to instruct the routers how to sort and arrange the packets by priorities assigned by the hybrid node.

The present invention is directed to solving the problem of prioritizing packets transmitted by a hybrid node within a heterogeneous network, particularly when congestion occurs within the network.

SUMMARY OF THE INVENTION

The invention comprises a technique for maintaining priority of packets transmitted over a heterogeneous network by a hybrid node coupled to the network. Broadly stated, the hybrid node assigns each packet a transmission priority (TP) level as it traverses protocol layers of a communications stack of the node. According to the inventive technique, a novel application programming interface (API) extension provides a tagging mechanism for conveying the TP levels from higher protocol layers of the stack to lower layers. The TP levels are then converted to information that is "tagged" to the packets and these tagged packets are then apportioned among a plurality of communication sessions based on the TP level assigned to each packet. The tagged packets and their associated sessions preserve the priority and order of the packets across the heterogeneous network.

In the illustrative embodiment of the invention, the heterogeneous network is preferably a data link switching (DLSw) network and the hybrid node is an advanced peer-to-peer networking (APPN) node having DLSw capabilities. The DLSw network includes an Internet protocol (IP) backbone network and the APPN node communicates with a DLSw switching node by way of data link control (DLC) connections overlayed onto transmission control protocol (TCP) sessions over the IP network.

In accordance with an aspect of the present invention, DLSw protocol layers within the nodes distribute the packets among the TCP sessions based on the TP level assigned to each packet; notably, packets associated with a particular DLC connection may be apportioned among any/all of the TCP sessions. Moreover, an APPN protocol layer of the APPN node preferably assigns one of four TP levels to each packet. In accordance with another aspect of the invention, the API used to pass the TP level information between the APPN and DLSw layers is a data_request message having a unique priority field extension.

Specifically, the two communicating nodes cooperate in a DLSw peer-relationship to establish four TCP sessions over the network. In yet another aspect of the invention, each TCP session is associated with a TP level. Intermediate priority queuing may be implemented by conventional techniques used to prioritize traffic in an IP network, such as with IP precedence bits or weighted fair queuing.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 5:
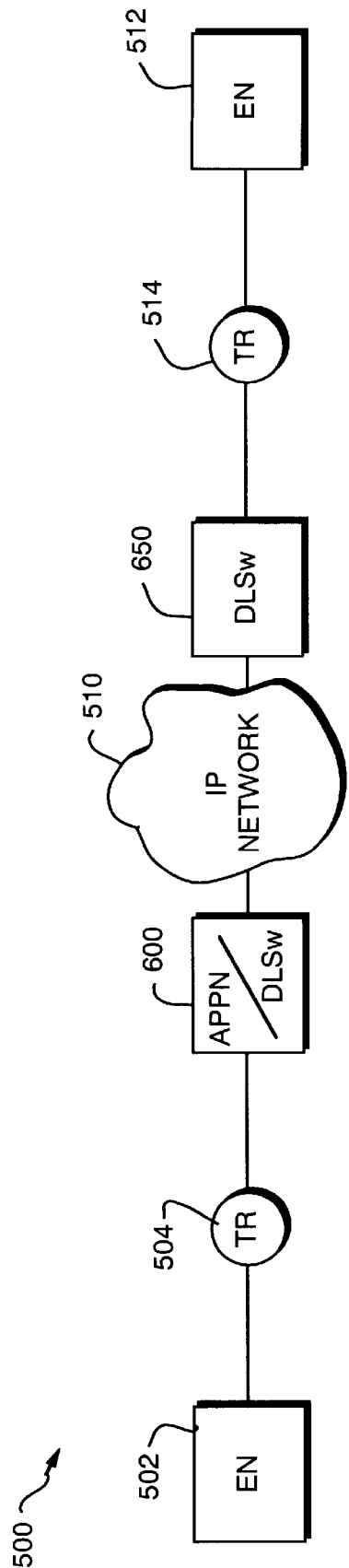
FIG. 5 is a block diagram of a heterogeneous computer network, including a DLSw node and an APPN/DLSw hybrid node for interconnecting various subnetworks and communication links on which the present invention may advantageously operate.

FIG. 5 is a block diagram of a computer network 500 comprising a collection of interconnected communication links and subnetworks attached to a plurality of stations. The stations are typically computers comprising end stations 502, 512 and intermediate stations 600, 650. Preferably, the end stations are Advanced Peer to Peer Networking (APPN) end nodes, although the stations may comprise other types of nodes such as Low Entry Networking nodes or Physical Units 2.0 via Dependent Logical Unit Requestor functions. In addition, the intermediate station 650 is preferably a data link switching (DLSw) node and intermediate station 600 is an APPN/DLSw hybrid node. It should be noted, however, that intermediate station 650 may be implemented as a hybrid node to prioritize traffic in a reverse direction.

Each node typically comprises a plurality of interconnected elements, such as a processor, a memory and a network adapter. The memory may comprise storage locations addressable by the processor and adapter for storing software programs and data structures associated with the inventive tagging mechanism and techniques. The processor may comprise processing elements or logic for executing the software programs and manipulating the data structures. An operating system, portions of which are typically resident in memory and executed by the processor, functionally organizes the node by, inter alia, invoking network operations in support of software processes executing on the node. It will be apparent to those skilled in the art that other processor and memory means, including various computer readable media, may be used for storing and executing program instructions pertaining to the techniques described herein.

The subnetworks included within network 500 are preferably local area networks (LANs) and the communication links may include wide area network (WAN) links; in the illustrative embodiment of the invention, the LANs are token rings (TR) 504, 514 and an IP network 510, which may comprise either a LAN and/or a WAN configuration such as X.25, inteconnects the nodes 600, 650. Communication among the nodes coupled to the network 500 is typically effected by exchanging discrete data packets or frames via connection-oriented service sessions between the communicating nodes.

Figure 3:
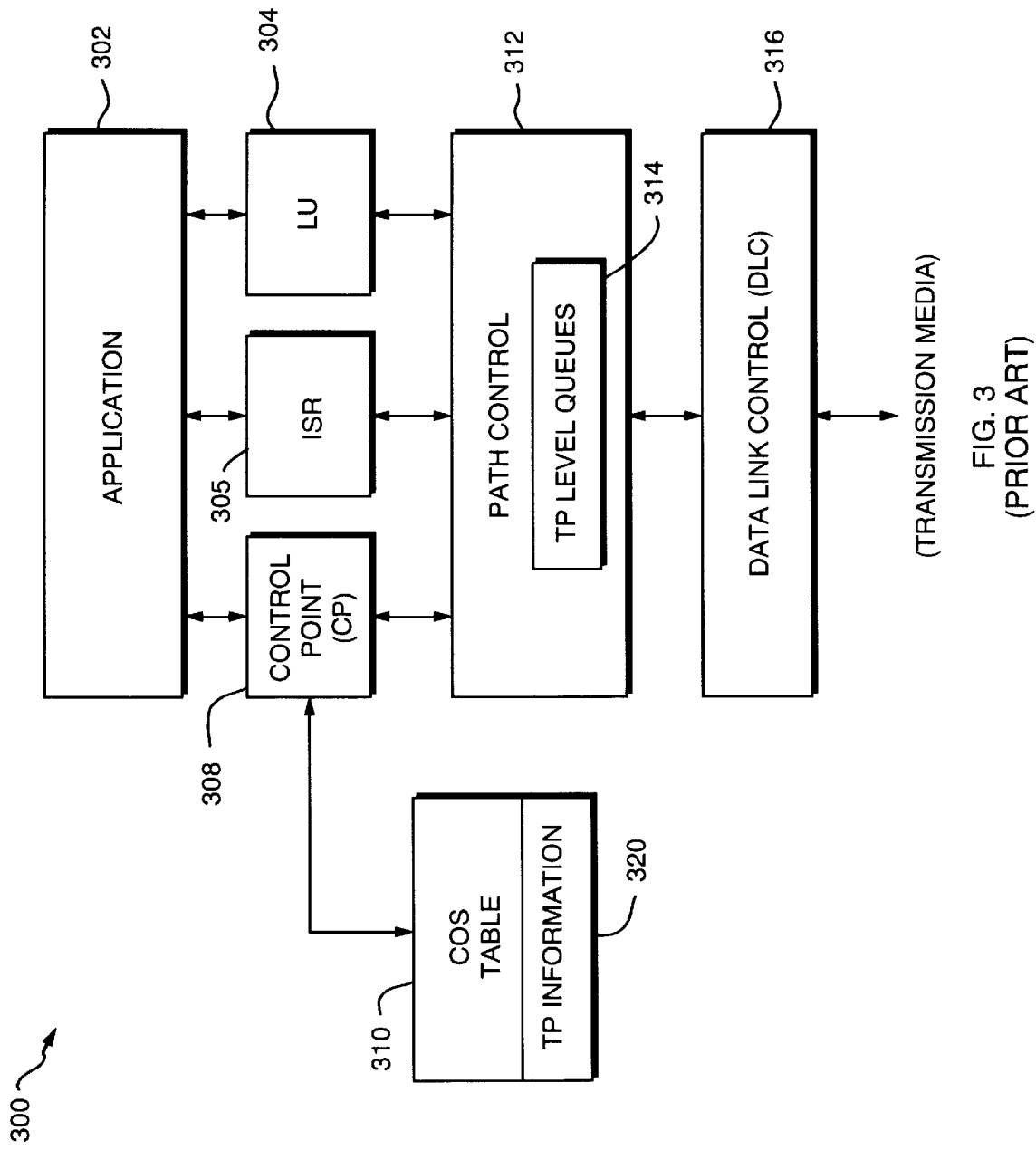
FIG. 3 is a schematic block diagram of the software architecture a prior art APPN node.
Figure 6:
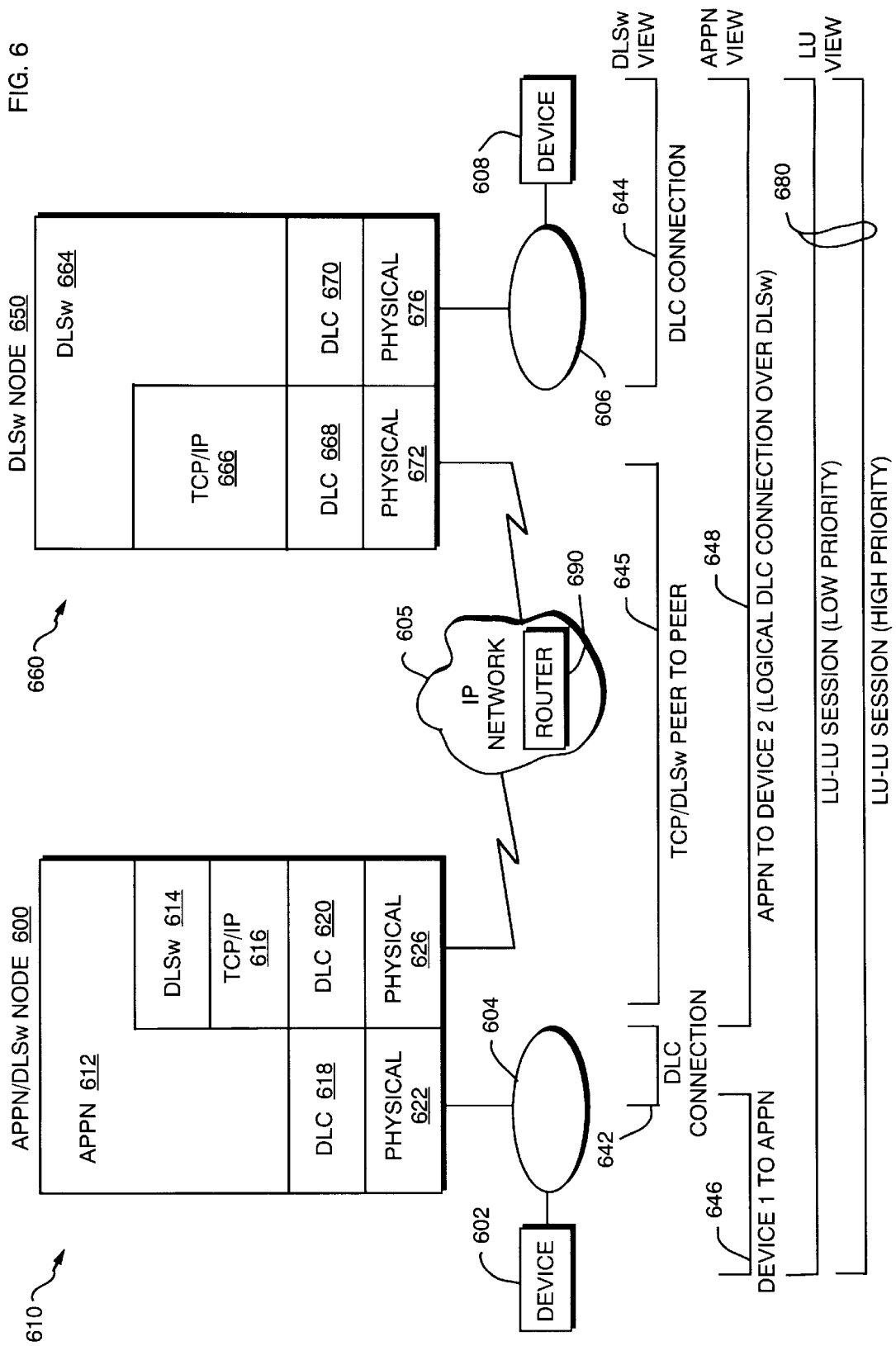
FIG. 6 is a schematic block diagram of protocol stacks contained within DLSw and APPN/DLSw nodes of a heterogeneous computer network similar to the network of FIG. 5.

Heterogeneous network 500 is formed when APPN/DLSw hybrid node 600 is connected to DLSw node 650 via an IP network. FIG. 6 is a schematic block diagram of protocol stacks 610, 660 within the nodes 600 and 650, respectively. Applications executing on SNA devices (end stations) 602, 608 typically access the network through logical units (LUs) of the stations and communicate via LU-LU sessions. Hybrid node 600 functions to facilitate establishment and routing of these connection-oriented communication sessions within the network. To this end, protocol stack 610 preferably comprises an APPN layer 612 that contains the software modules described in FIG. 3.

Figure 1:
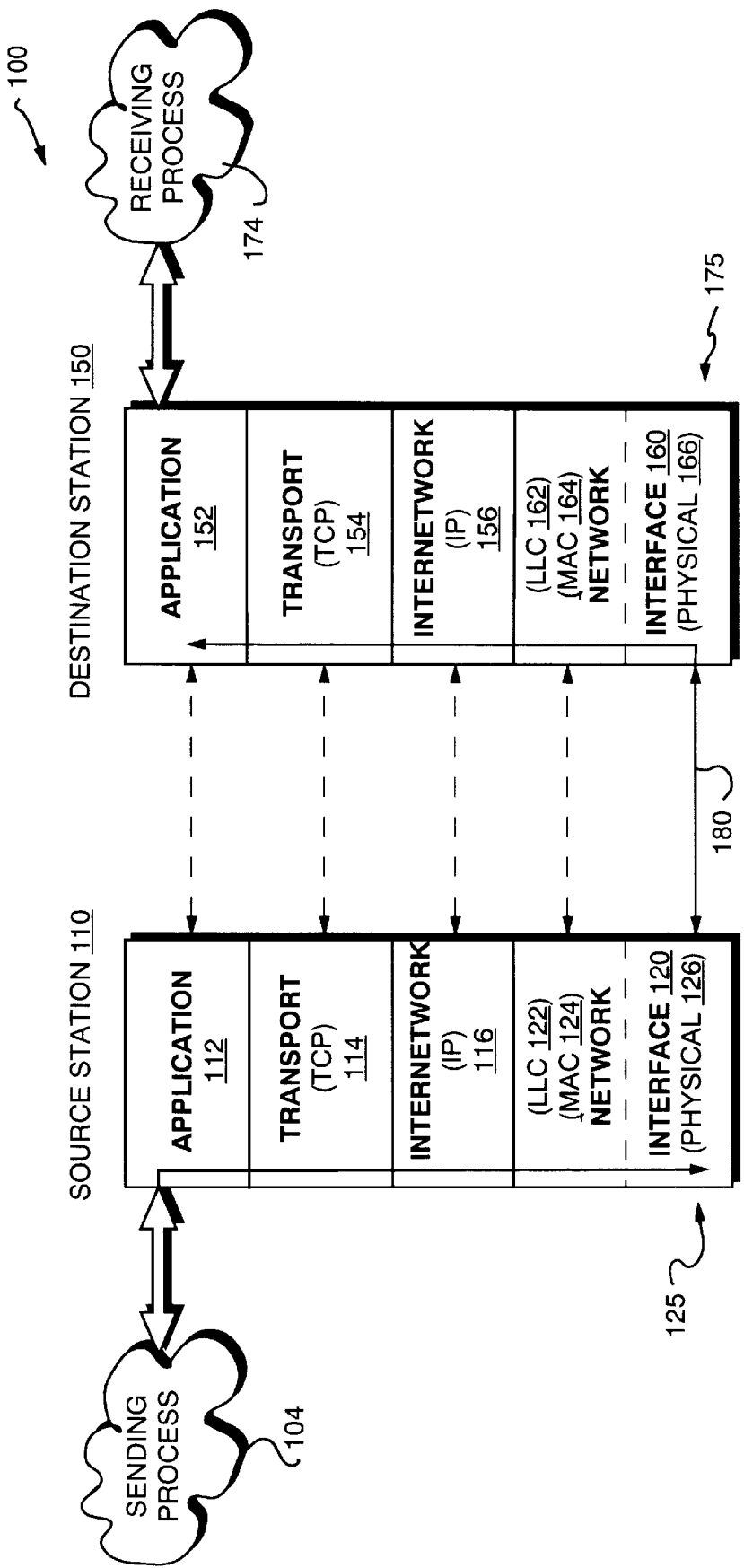
FIG. 1 is a schematic block diagram of prior art communications architecture protocol stacks, such as the Internet protocol stack, used to transmit data between stations of a computer network.
Figure 2:
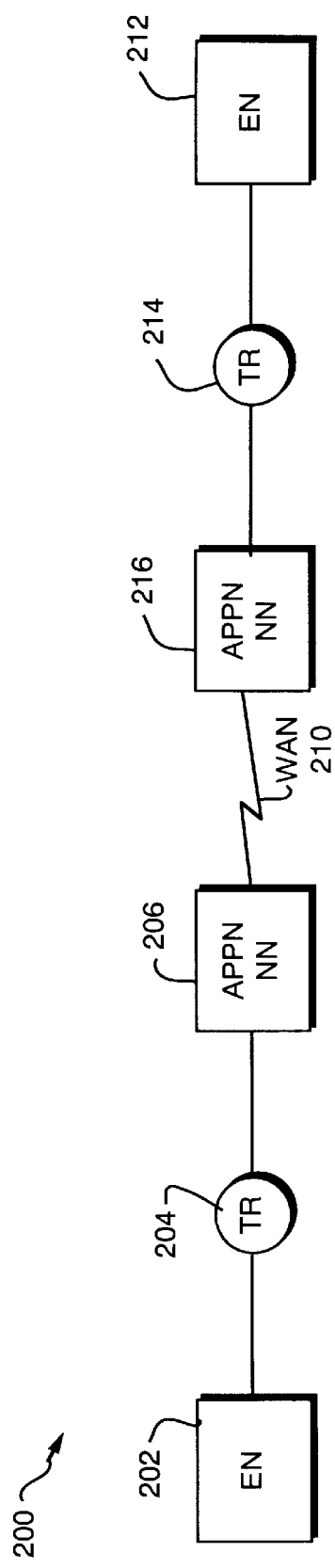
FIG. 2 is a schematic block diagram of a prior art Advanced Peer to Peer Networking (APPN) network including APPN nodes.
Figure 4:
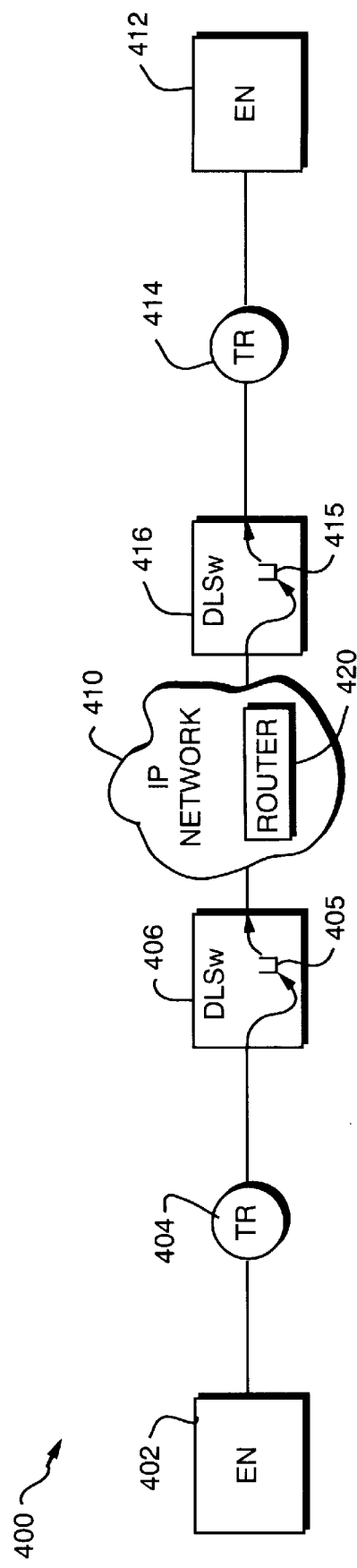
FIG. 4 is a schematic block diagram of a prior art data link switching (DLSw) network.

The stack 610 also includes a Transmission Control Protocol/Internet protocol (TCP/IP) layer 616 containing those layers of the Internet communications architecture protocol stack (FIG. 1) needed to establish, e.g., conventional connection-oriented, TCP communication sessions. Physical sublayers 622 and 626 specify the electrical, mechanical, procedural and functional specifications for activating, maintaining and de-activating the physical links 604 and 605 of the network. Protocol stack 660 of DLSw node 650 likewise includes a TCP/IP layer 666 and physical sublayers 672 and 676, which are functionally equivalent to those layers of protocol stack 610.

Each node 600, 650 further contains a DLSw layer 614, 664 and data link control (DLC) layers 618, 620 and 668, 670, respectively, the latter layers providing a connection-oriented service via conventional DLC connections. The DLSw layers provide a mechanism for forwarding data frame traffic between devices 602, 608 over IP network 605. Preferably, the DLSw layers 614, 664 cooperate in a peer-relationship and communicate via a switch-to-switch protocol (SSP) to, inter alia, define TCP sessions over the IP network.

In the illustrative embodiment, there are a plurality of connection/session "views" established within the network. For example, from an APPN view, there is a DLC connection 646 between device 602 and APPN layer 612 of node 600, and a DLC connection 648 between APPN layer 612 and device 608. From a DLSw view, there is a DLC connection 642 between APPN layer 612 and DLSw layer 614 of node 600, and a DLC connection 644 between DLSw layer 664 and device 608; in order to provide reliable, end-to-end connections between the devices, these DLC connections are "overlayed" onto TCP sessions (denoted 645) between the two DLSw layers 614, 664. Lastly, from a LU view, there are multiple LU-LU sessions 680 (at various priority levels) between the LUs of devices 602 and 608.

It should be noted that the TCP sessions are initiated between DLSw peers 614, 664 in accordance with a conventional TCP transport protocol. Thereafter, SSP control messages are exchanged between the DLSw layers 614, 664 of the nodes to establish an end-to-end DLSw circuit over the session. Information contained within these control messages are used to generate a DLSw circuit identifier that associates the DLSw circuit with the session. Preferably, the DLC connections 642, 644 overlayed on the TCP session 645 "map" to the DLSw circuit. The generation of DLSw circuits and identifiers is described in *Request for Comment* (RFC) 1795 by Wells & Bartky, 1995, while the establishment of multiple TCP sessions between DLSw peer layers is described in both RFC 1795 and *Internetworking with TCP/IP* by Comer and Stevens, printed by Prentice Hall, 1991; all of these publications are hereby incorporated by reference as though fully set forth herein.

Figure 7:
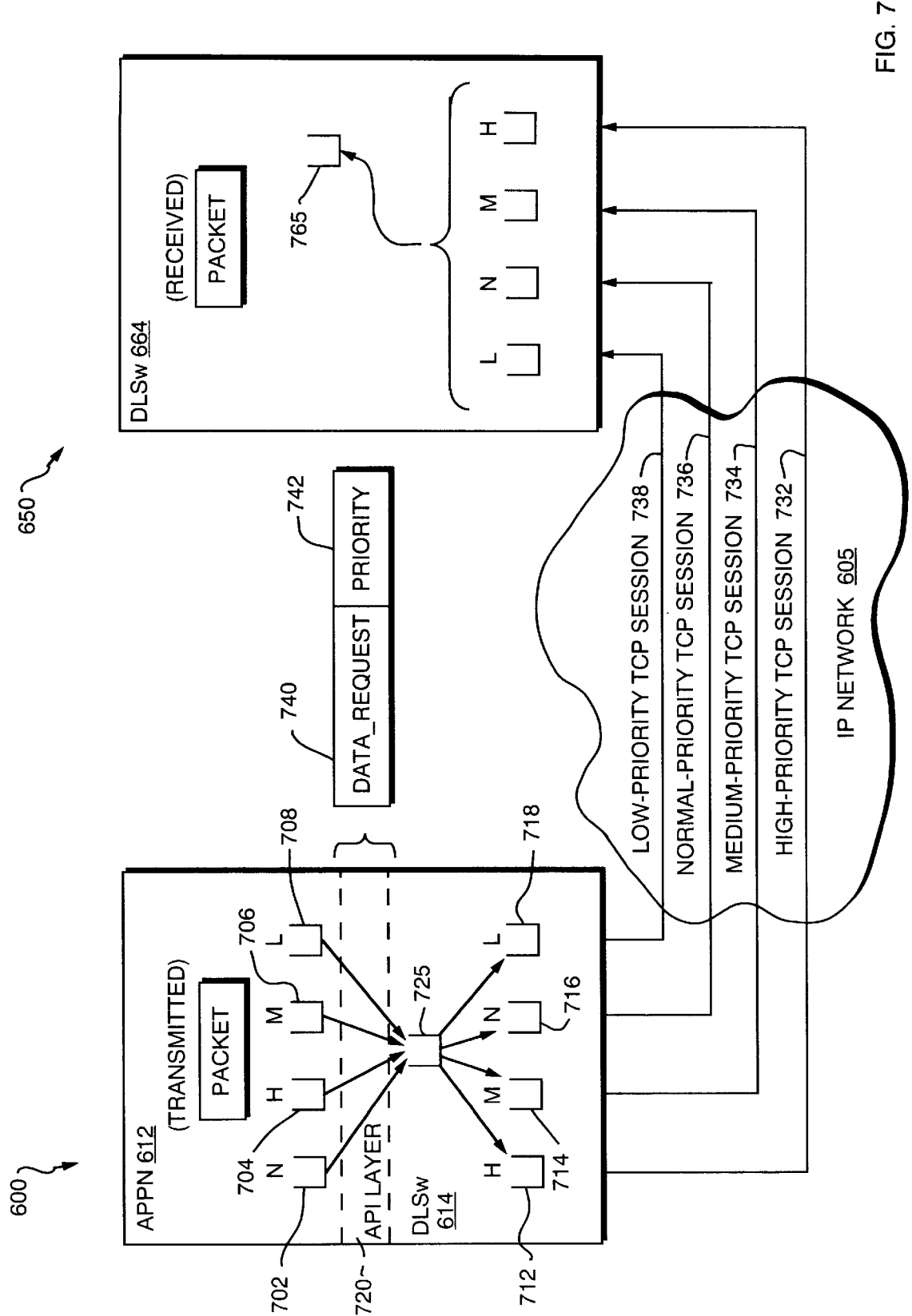
FIG. 7 is a schematic block diagram illustrating the assignment of priority levels among established communication sessions using a novel application programming interface extension and the distribution of packets among the sessions in accordance with the present invention.

Typically, packets transmitted by a DLSw switch over a TCP session flow at the same priority level from a single output queue of the switch and arrive at a peer DLSw switch in the same order in which they are transmitted. Hybrid node 600 may, however, prioritize the packets of a LU-LU session at the APPN layer 612 in an order specified by transmission priority (TP) information contained within the node 600. FIG. 7 is a schematic block diagram illustrating the assignment of TP levels among established communication sessions using a novel application programming interface (API) extension and the distribution of packets among those sessions in accordance with the present invention.

A path control module 312 (FIG. 3) of the APPN layer 612 within node 600 maintains four queues 702–708, one for each TP level, for transmitting data packets (received from DLC connection 646) over established TCP sessions 645 of the network. Yet, that priority arrangement is typically lost when passing the data to the DLSw layer 614 as the prioritized packets are fimneled onto a single output queue 725 for transmission over the TCP sessions. Subsequent congestion within the IP network at, e.g., intermediate routers 690 (FIG. 6), may disrupt the orderly flow of packets and without the TP information, those routers cannot re-arrange the order of the packets by priorities assigned by the hybrid node 600.

In accordance with the present invention, a technique is provided for maintaining the TP priority levels of packets assigned by hybrid node 600 prior to transmission over heterogeneous network. In one aspect of the technique, a novel API extension provides a tagging mechanism for conveying the TP levels from the APPN layer 612 to the DLSw layer 614. The API is preferably a data_request message 740 having a unique priority field extension 742 that specifies the TP level of an associated packet. The APPN layer 612 assigns one of the four TP levels to the packet by loading a value of the TP level into field 742. The message 740 is then passed from the APPN protocol layer to the DLSw layer via an API layer 720. The DLSw layer 614 loads the packets into the queue 725 and then distributes them among four queues 712–718; each queue is preferably associated with a TP level.

As described above, TCP sessions are established through the IP network 605 in accordance with conventional TCP/IP transport mechanisms within the APPN/DLSw node 600 and the DLSw node 650; illustratively, these nodes cooperate operate in a peer-relationship to establish multiple, parallel TCP sessions 732–738 738 over the network. In accordance with another aspect of the invention, each TCP session is associated with a TP level; for example, session 732 is assigned a high-priority level, session 734 is assigned a medium-priority level, session 736 is assigned a normal-priority level and session 738 is assigned a low-priority level.

The DLSw layer 614 distributes the tagged packets among the TCP communication sessions 732–738 based on the TP level contained in the field 742 of message 740. Specifically, the DLSw layer 614 of node 600 directs the packets to the appropriate one of the TCP queues 712–718. The peer DLSw layer 664 of node 650 receives the packets from all four TCP sessions and loads them onto a single output queue 765 in the order delivered by the IP network 605. That layer then transmits the packets over corresponding DLC connection 644 in the same order. Notably, the packets pass through the IP backbone network of routers leveraging priority output queuing techniques, such as weighted fair queuing and precedence bits, to achieve bandwidth management of the IP network; using these techniques, the routers select appropriate TCP session flows for prioritization.

Operation of the present inventive technique will now be described in connection with FIGS. 1–7. DLC connections are established between station 602 and hybrid node 600, and between station 608 and DLSw node 650; these DLC connections are "overlayed" onto TCP sessions that are established between the hybrid node 600 and the DLSw node 650. Packets associated with the DLC connections are mapped to a DLSw circuit by a DLSw circuit ID. An application 302 executing on station 602 initiates LU-LU sessions by, inter alia, distributing BIND messages that specify a mode name for each session being established. During the BIND exchange, APPN/DLSw hybrid node 600 uses the mode name to establish TP priority levels for a particular session.

Once the LU-LU sessions are established, the application 302 transmits a stream of packets over these communication sessions to node 600. The APPN layer 612 apportions the packet stream into individual LU-LU session streams and associates the DLSw circuit ID and TP level priorities with them. For example, packets of a particular LU-LU session are assigned a network (N) priority level by the APPN layer 612 of node 600 and are passed from N queue 702 to the output queue 725 of DLSw layer 614. Based on the highest-priority TP level value in field 742 of message 740, the DLSw layer 614 maps those packets to a high-priority TCP session associated with a high (H) priority queue 712 and loads the packets onto that queue. It should be noted that the packets of the particular LU-LU session have the same DLSw circuit ID as packets of another LU-LU session; according, packets with the same DLSw circuit ID may be assigned by layer 612 to any one of the four TCP queues/sessions based on the TP information associated with the packet.

TCP/IP within layer 616 of node 600 may use any of a number of techniques to prioritize the TCP/IP sessions within the IP backbone. These techniques include, but are not limited to, resource reservation protocol (RSVP), weighted fair queuing (WFQ) and precedence bits. As an example of the latter technique, layer 616 maps the high-priority designation of the packets to a predetermined value of precedence bits, e.g., "immediate", and configures those bits as a "tag" within a type of service (TOS) field when building WP headers for the packets. Thereafter, the high-priority packets are transferred through the core IP backbone network 605 where priority is preserved at intermediate queuing points of routers 690 on the basis of the value of the precedence bits in the IP header. The packets for each TCP session are then delivered to the DLSw node 650 in the same order transmitted from node 600; significantly, packets of the higher priority TCP session may be delivered to the node 650 before packets of the lower priority TCP sessions even though the lower priority packets were sent first by node 600. These subsequently-transmitted lower-priority packets may be "queued-up" at the intermediate routers 690 of IP network 605 and transmitted when appropriate.

Advantageously, the present invention enables the APPN layer of a hybrid node to instruct the DLSw layer and other nodes along a session as to transmission priority on a packet-by-packet basis, as opposed to a DLC connection or DLSw circuit basis. Furthermore, the DLSw layer allows a single DLSw circuit to be distributed across a plurality of TCP sessions. The TCP sessions preserve the priority and order of the packets across the heterogeneous network, while intermediate priority queuing may be implemented by conventional techniques used to prioritize traffic within the network. The TP levels provide a performance enhancement, especially for high-loaded networks, because sessions established with higher transmission priority modes are serviced faster than those having lower priority modes.

While there has been shown and described an illustrative embodiment for maintaining priority of packets transmitted over a heterogeneous network by a hybrid node coupled to the network, it is to be understood that various other adaptations and modifications may be made within the spirit and scope of the invention. For example in an alternate embodiment of the invention, a separate DLSw queue may be provided within the DLSw layers of the nodes for each DLSw circuit that is established.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for maintaining priority of packets transmitted over a plurality of communication sessions of a first network in a heterogeneous network by a hybrid node coupled to a switching node by the first network, the method comprising the steps of:

assigning each packet a respective transmission priority (TP) level at an Advanced Peer to Peer Networking (APPN) layer as each packet traverses protocol layers of a communications stack of the hybrid node, said packets being received by the hybrid node from a second network in the heterogeneous network, said packets being associated with a particular connection for transmission of said packets in said second network;

apportioning the packets among the plurality of communication sessions at a Data Link Switching (DLSw) layer coupled to the APPN layer based on the respective TP level assigned to each packet; and transmitting the packets over the communication sessions based upon said apportioning so as to preserve the priority and order of the packets across the heterogeneous network.

2. The method of claim 1 wherein the step of assigning comprises the step of conveying the TP levels from higher protocol layers of the stack to lower protocol layers using an application programming interface (API) extension.

3. The method of claim 2 wherein the switching node is a DLSw node and the hybrid node is an APPN node having DLSw capabilities, and wherein the nodes cooperate in a DLSw peer relationship to establish the communication sessions.

4. The method of claim 3 wherein the higher protocol layers of the stack include an APPN layer and the lower protocol layers include a DLSw layer.

5. The method of claim 4 wherein the communication sessions are Transmission Control Protocol (TCP) sessions and wherein the step of apportioning comprises the step of apportioning packets associated with a single Data Link Control connection among more than one of the TCP sessions.

6. The method of claim 4 wherein the communication sessions are Transmission Control Protocol (TCP) sessions and wherein the step of apportioning comprises the step of distributing the packets among the TCP sessions at the DLSw layer of the APPN node.

7. The method of claim 4 wherein the step of assigning further comprises assigning one of four TP levels to each packet at the APPN protocol layer of the APPN node.

8. Apparatus for maintaining priority of packets transmitted over a plurality of communication sessions of a heterogeneous network to a switching node, the apparatus comprising:

a node coupled to the network and configured to transmit the packets over the communication sessions, the node having a communication stack including an Advanced Peer to Peer Networking (APPN) layer coupled to a Data Link Switching (DLSw) layer via an application programming interface layer, the APPN layer assigning the packets transmission priority (TP) levels that are conveyed to the DLSw layer by way of a tagging mechanism and the DLSw layer distributing the packets among the plurality of communication sessions based on the assigned TP levels to preserve the priority of the transmitted packets.

9. The apparatus of claim 8 wherein the tagging mechanism is an application programming interface (API).

10. The apparatus of claim 9 wherein the API is a data_request message having a priority field extension that specifies the TP level of an associated packet.

11. The apparatus of claim 10 wherein the APPN layer assigns a TP level to the packet by loading a value of the TP level into the priority field of the message.

12. The apparatus of claim 11 wherein the APPN layer maintains a plurality of APPN layer queues, one for each TP level.

13. The apparatus of claim 12 wherein the DLSw layer maintains a single output queue for receiving the packets from the APPN layer.

14. The apparatus of claim 13 wherein the DLSw layer further maintains a plurality of DLSw queues, each associated with a TP level, and wherein the DLSw layer distributes the received packets from the single output queue among the plurality of DLSw queues based on the TP level assigned to each packet.

15. The apparatus of claim 14 wherein the switching node is a DLSw node, the heterogeneous network is a DLSw network and the hybrid node is an APPN node having DLSw capabilities, and wherein the nodes cooperate in a DLSw peer relationship to establish the communication sessions.

16. The apparatus of claim 15 wherein the communication sessions are Transmission Control Protocol (TCP) sessions and wherein the packets associated with a single DLSw circuit are distributed among more than one of the TCP sessions.

17. A computer readable medium containing executable program instructions for maintaining priority of packets transmitted over a plurality of communication sessions of a first network in a heterogeneous network, the executable program instructions comprising instructions for:

assigning packets respective transmission priority (TP) levels at an Advanced Peer to Peer Networking (APPN) layer as the packets traverse protocol layers of a communications stack of a hybrid node coupled to the first network, said packets being received by the hybrid node from a second network in the heterogeneous network, said packets being associated with a particular connection for transmitting said packets in said second network;

distributing the packets among the plurality of communication sessions at a Data Link Switching (DLSw) layer coupled to the APPN layer based on the respective TP level assigned to each packet; and transmitting the packets over the communication sessions based upon said distributing to a switching node so as to preserve the priority and order of the packets across the heterogeneous network.

18. The medium of claim 17 wherein the switching node is a DLSw node and the hybrid node is an APPN node having DLSw capabilities, and wherein the nodes cooperate in a DLSw peer relationship to establish the communication sessions.

* * * * *